(12) United States Patent
Chung et al.

(10) Patent No.: US 7,597,186 B2
(45) Date of Patent: Oct. 6, 2009

(54) SUBSTRATE TRANSPORT DEVICE

(75) Inventors: Yun-Sheng Chung, Hsinchu (TW); Fu-Ching Tung, Hsinchu (TW); Hsin-Hung Huang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 255 days.

(21) Appl. No.: 11/616,252

(22) Filed: Dec. 26, 2006

(65) Prior Publication Data

US 2008/0038020 A1   Feb. 14, 2008

(30) Foreign Application Priority Data

Aug. 11, 2006   (TW)   ............................... 95129550 A (51) Int. Cl.
*B65G 35/00*   (2006.01)
(52) U.S. Cl. ..................................................... 198/619
(58) Field of Classification Search ................ 198/619, 198/679, 805, 690.1
See application file for complete search history.

(56) References Cited

U.S. PATENT DOCUMENTS

| | | | | |
|---|---|---|---|---|
| 5,377,816 A | * | 1/1995 | Deligi et al. ................. | 198/619 |
| 6,206,176 B1 | * | 3/2001 | Blonigan et al. ............ | 198/619 |
| 6,471,459 B2 | * | 10/2002 | Blonigan et al. ............ | 414/217 |
| 6,561,343 B2 | * | 5/2003 | Miyauchi et al. ............ | 198/619 |
| 6,607,073 B2 | * | 8/2003 | Buchi et al. ................. | 198/805 |
| 6,679,671 B2 | * | 1/2004 | Blonigan et al. ............ | 414/217 |
| 7,438,175 B2 | * | 10/2008 | White et al. ............. | 198/346.2 |
| 2002/0117378 A1 | * | 8/2002 | Buchi et al. ................. | 198/619 |
| 2002/0144881 A1 | * | 10/2002 | Miyauchi et al. ............ | 198/619 |
| 2006/0011093 A1 | * | 1/2006 | Jensen et al. ................ | 198/619 |

FOREIGN PATENT DOCUMENTS

| | | |
|---|---|---|
| DE | 10150319 | 5/2003 |
| JP | 11-311260 | 11/1999 |
| KR | 20-2000-0014681 | 3/2000 |
| KR | 10-2001-0025062 | 3/2001 |

* cited by examiner

*Primary Examiner*—Gene Crawford
*Assistant Examiner*—William R Harp
(74) *Attorney, Agent, or Firm*—Quintero Law Office (57) ABSTRACT

A substrate transport device includes a chamber, a rotary wheel, a first magnet, a carrier, and a second magnet. The rotary wheel is disposed outside the chamber. The first magnet is disposed on the rotary wheel. The carrier is disposed in the chamber. The second magnet is disposed on the carrier.

21 Claims, 8 Drawing Sheets

SUBSTRATE TRANSPORT DEVICE

BACKGROUND OF THE INVENTION

1. Field of the Invention

The invention relates to substrate transport device, and in particular to a substrate transport device in a chamber.

2. Description of the Related Art

Currently, manufacturing process equipment often comprises a process chamber with all the parts of the transport devices disposed therein. The transport devices can be classified into contact and non-contact-types. For contact-type transport devices, objects are typically transported by mechanical means. During transportation, however, ricochet or yawing may occur due to abrasion of the parts. In addition, the processes are susceptible to contamination by particles produced by friction between the parts, thus significantly affecting quality. In non-contact-type transport devices, objects are transported by non-contact forces (e.g. air current, magnetic, and similar). Germany OTB SOLAR Corp. has successfully developed a non-contact transport device which transports objects by electromagnetic force. The device can solve the problems of the contact-type transport device. However, all the driving parts and the driven parts, disposed in the process chamber, remain susceptible to contamination by the process environment and reaction products, thus increasing the maintenance cost.

BRIEF SUMMARY OF THE INVENTION

The invention provides a substrate transport device to solve the above problems.

The substrate transport device has a simple structure and is suitable for disposition in the interior of a chamber without producing particles, avoiding contamination in the process environment.

A plurality of rotary wheels is provided outside the chamber. The substrate transport device comprises a plurality of first magnets disposed along the circumference of the rotary wheel, wherein the magnetic poles of a first magnet and the adjacent magnetic poles of other first magnets are opposite.

A carrier is provided in the chamber. A plurality of second magnets is disposed under the carrier inline with a direction of movement of the carrier, wherein the magnetic poles of a second magnet and the adjacent magnetic poles of other second magnets are opposite.

The first magnets on the rotary wheels and the second magnets on the carrier create magnetic fields to interact each other. When the rotary wheels outside the chamber are rotated, the magnetic fields change in phase. Thus, the second magnets on the carrier are driven by the first magnets on the rotary wheels to move. Thus, the carrier, along with the second magnets is moved.

The invention has the following merits: The structure of the transport device is simple. The carrier is smoothly moved in the chamber. The driving parts are disposed outside the chamber such that maintenance is simplified. The driven parts are disposed under the carrier and thus protected from reaction products. Deposition of the reaction products on the driven parts and the resultant corrosion can be avoided. The deposition of the reaction products on the driving parts which are disposed outside the chamber, and the resultant corrosion can be also avoided. The carrier is moved by magnetic non-contact forces. During transportation, abrasion of the parts and contamination of the chamber by particles are thus avoided.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
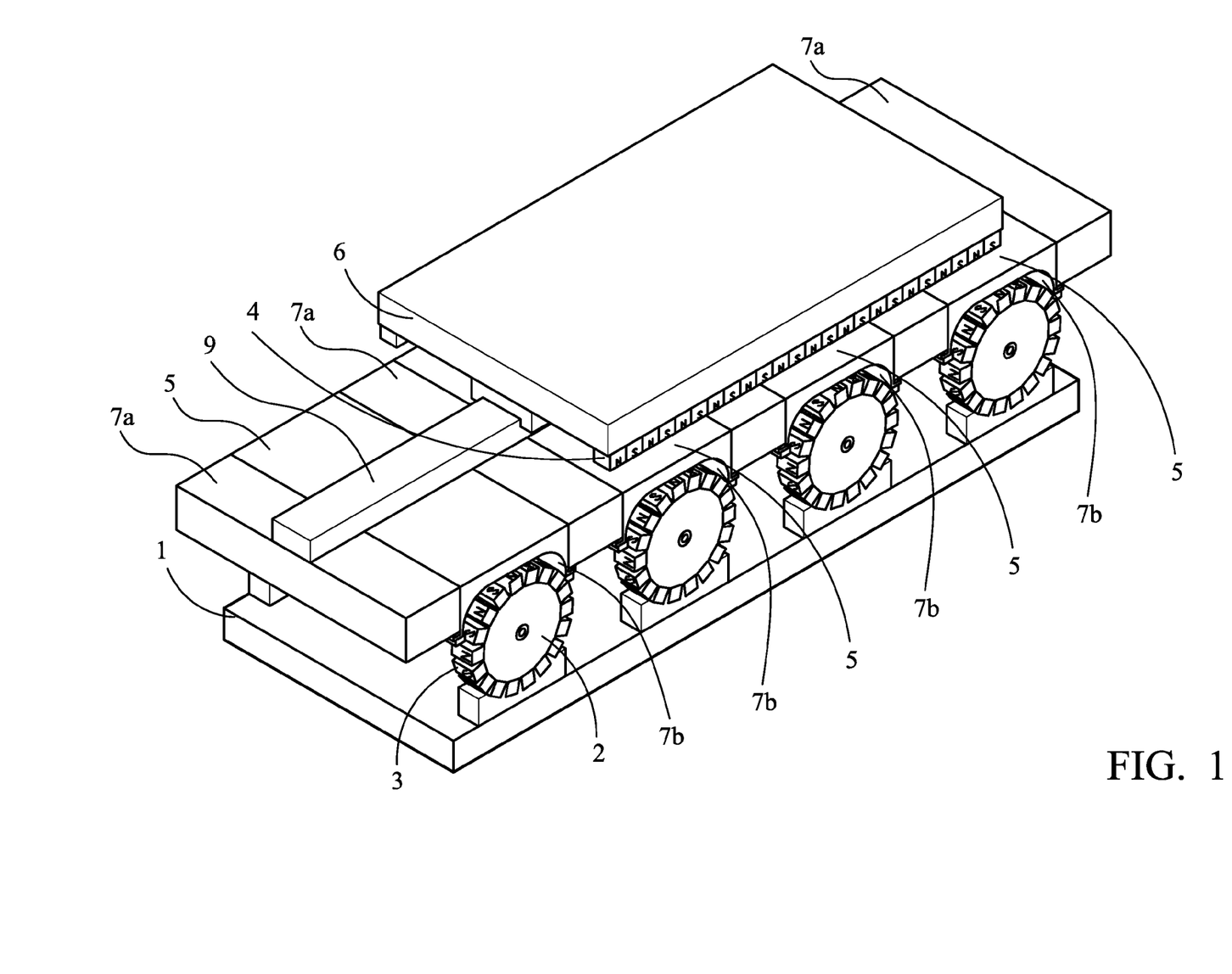
FIG. 1 is a perspective diagram of a substrate transport device in accordance with an embodiment of the invention.
Figure 2:
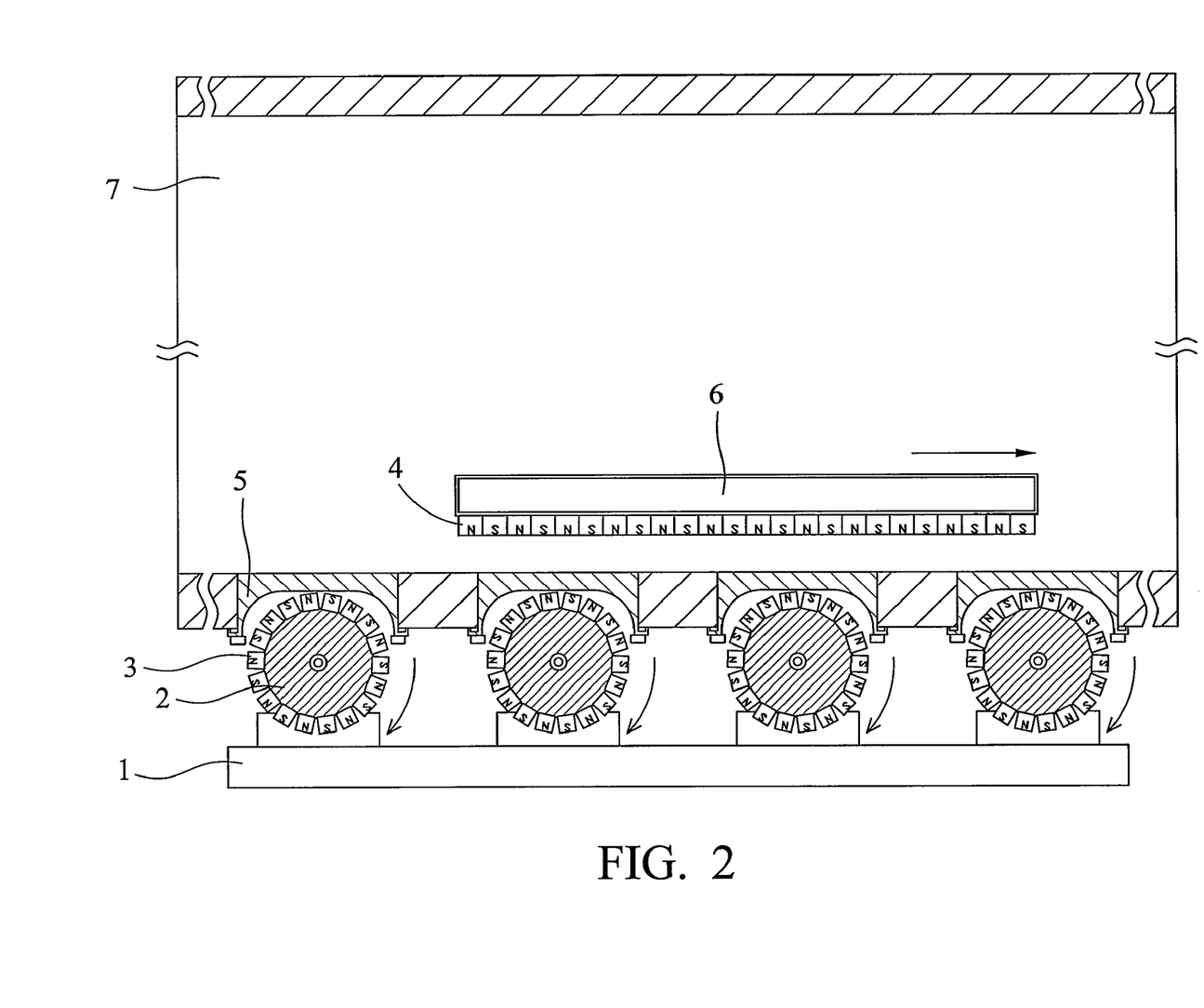
FIG. 2 is a sectional view of a substrate transport device in accordance with an embodiment of the invention.
Figure 3:
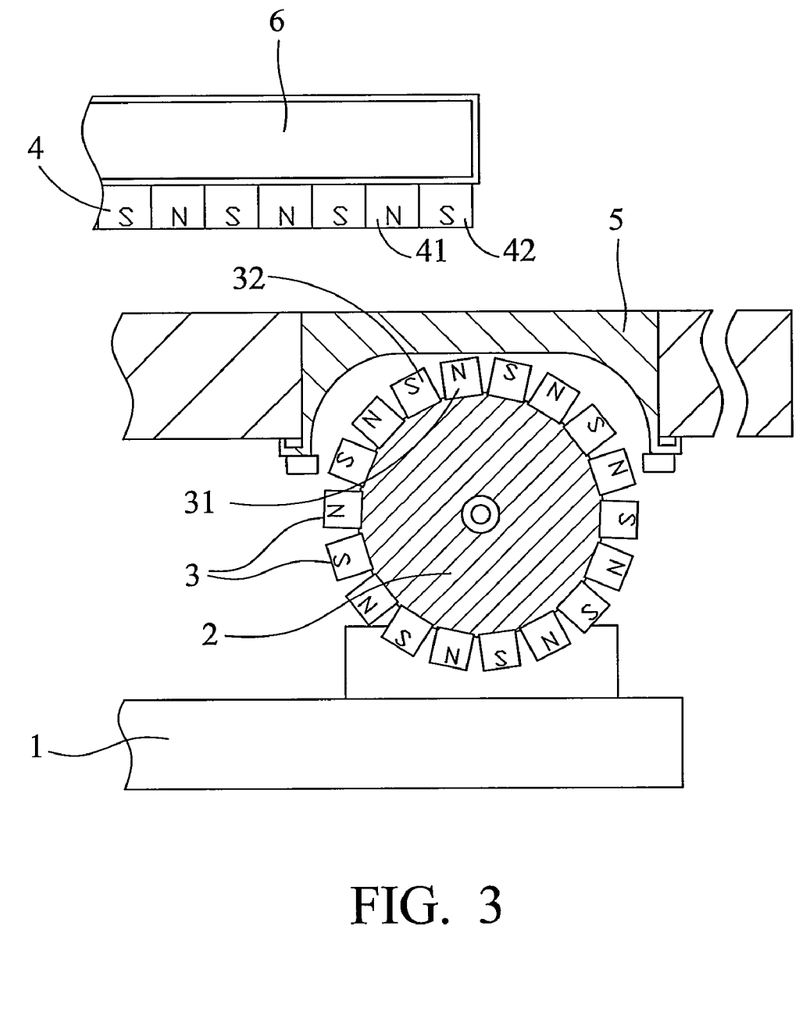
FIG. 3 is an enlarged local view of FIG. 2.

Referring to FIGS. 1, 2, and 3, a substrate transport device comprises a base 1, a plurality of rotary wheels 2, a plurality of first magnets 3, a plurality of second magnets 4, a plurality of partitions 5, a carrier 6, a chamber 7, and a rail 9.

Referring to FIG. 2, the base 1 is disposed outside the chamber 7. One or more rotary wheels 2 are disposed on the base 1. The shaft of the rotary wheel 2 is supported on the base 1, such that the rotary wheel 2 is rotatable rather than movable.

The rotary wheel 2 is disposed outside the chamber 7. As shown in FIG. 3, a plurality of first magnets 3 is disposed along the circumference of the rotary wheel 2 in such a way that a magnetic pole (e.g. the north pole 31) of a first magnet 3 and the adjacent magnetic poles (e.g. south poles 32) of other first magnets 3 are opposite. The first magnets 3 may be permanent magnets.

The carrier 6 is disposed in the chamber 7 and mounted on the rail 9. As shown in FIG. 1, chamber 7 comprises a bottom wall 7a with a plurality of openings 7b. The rail 9 supports the carrier 6 via the top and is fixed to the chamber 7 via the bottom such that it is transversely disposed across openings 7b. Thus, the carrier 6 is restricted to move forward and backward. As shown in FIG. 3, a plurality of second magnets is disposed on the bottom of the carrier in such a way that a magnetic pole (e.g. the north pole 41) of a second magnet 4 and the adjacent magnetic poles (e.g. south poles 42) of other second magnets 4 are opposite. The second magnets 4 may be permanent magnets.

The partitions 5, disposed between the first magnets 3 and the second magnets 4, are fixed to the chamber 7. As shown in FIG. 1, the partitions 5 are disposed in openings 7b and positioned over rotary wheels 2. The chamber 7 generally is made of inducible magnetic material (e.g. steel) that will allow multiple magnetic flux lines within, effectively concentrating the lines, and channeling the lines away from objects in the chamber. Therefore, the partitions 5 are not made of inducible magnetic material with proper thickness to avoid blocking magnetic forces between the second magnets 4 and the first magnets 3. It is understood, however, that the partitions 5 can be omitted when the chamber 7 is not made of inducible magnetic material with proper thickness to avoid blocking the magnetic forces.

Figure 4:
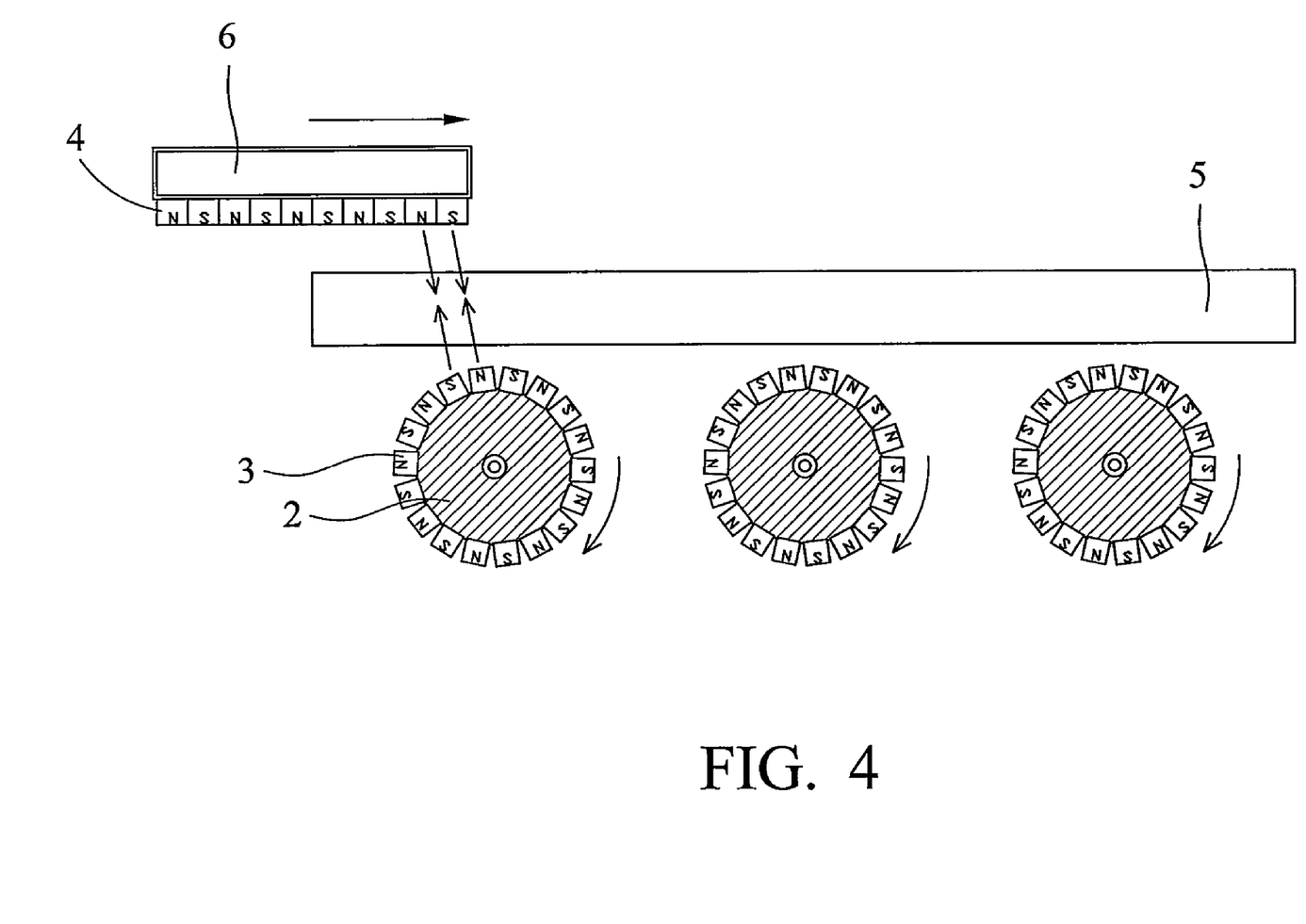
FIGS. 4, 5, and 6 depict operation of the substrate transport device in accordance with the invention.

Referring to FIG. 3, the N-pole 31 of the first magnetic 3 attracts the S-pole 42 of the second magnet 4, and the S-pole 32 of the first magnet 3 attracts the N-pole 41 of the second magnet 4. As shown in FIG. 4, when the rotary wheel 2 is rotated clockwise, the first magnets 3 thereon are driven to correspondingly rotate clockwise. Thus, the magnetic fields created by the first and second magnets change in phase. The magnetic forces induced by the magnetic fields also change, moving the second magnets 4 toward the right. The carrier 6, along with the second magnets 4 is moved toward the right.

Figure 5:
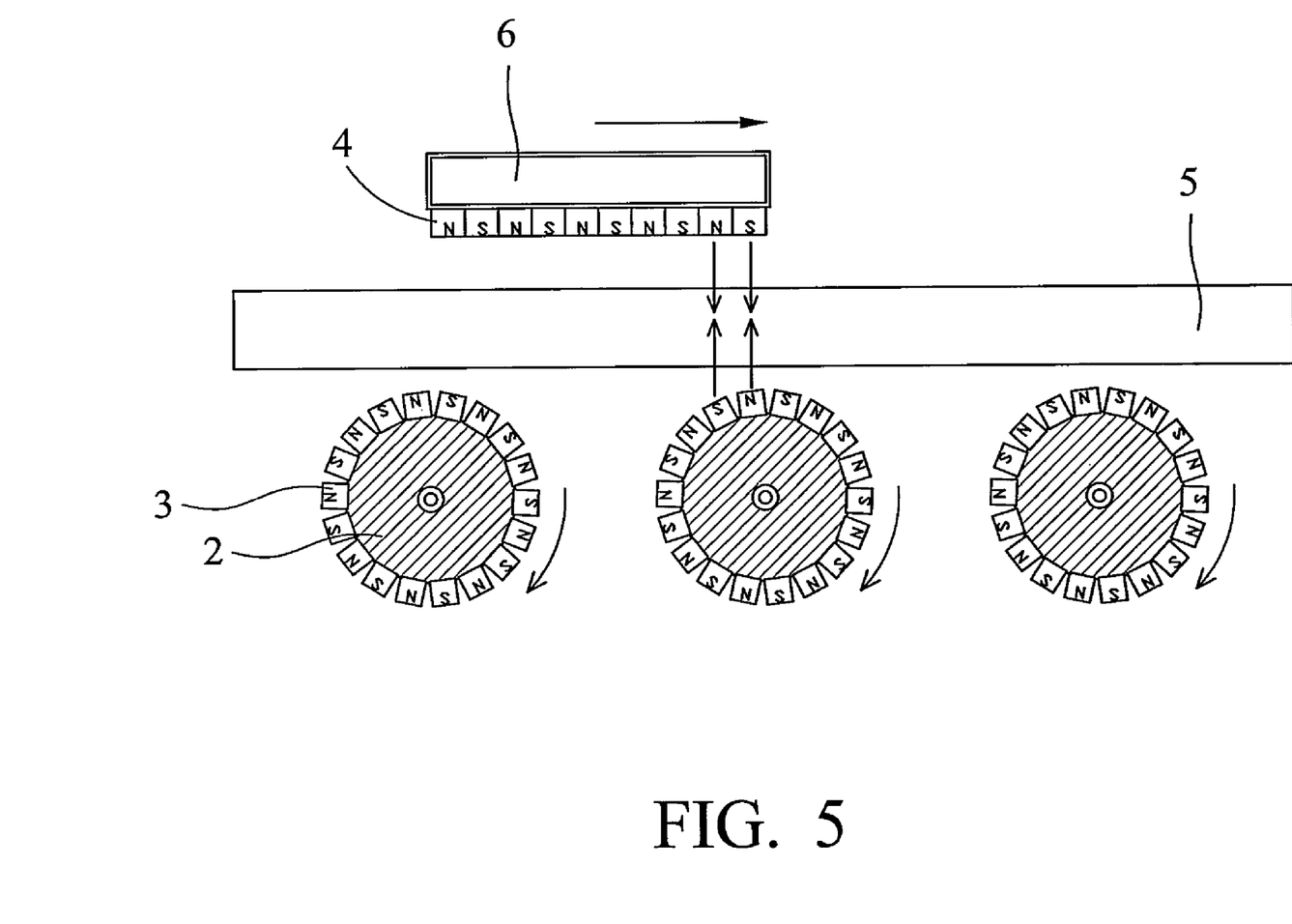
Figure 6:
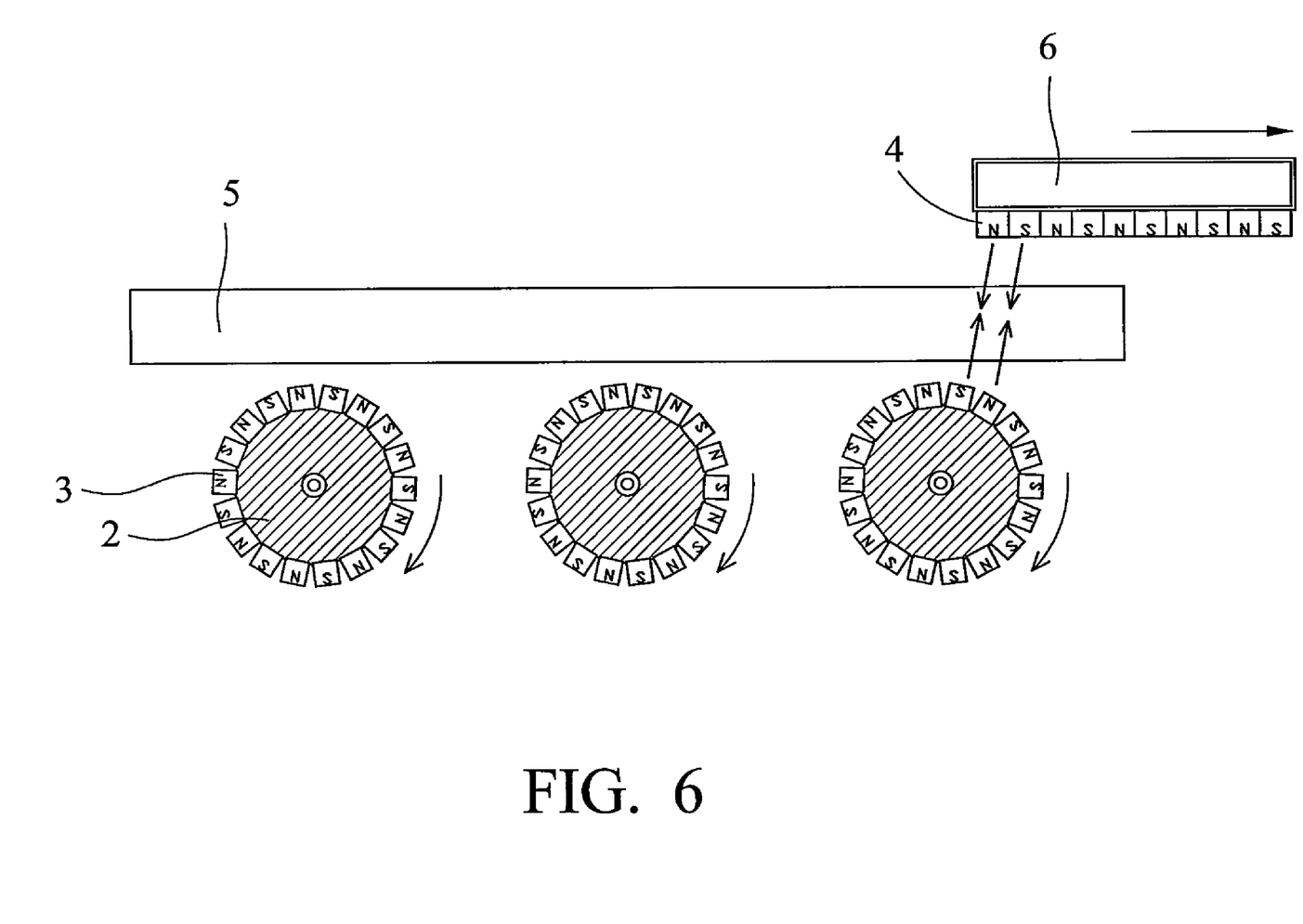

The rotary wheel 2 continues to rotate clockwise and the carrier 6 continues to move rightward. Then, as shown in FIG. 5, carrier 6 is increasingly influenced by the magnetic fields created by the first magnets of the next rotary wheel 2 and departs from the first (previous) rotary wheel 2. Similarly, the next rotary wheel 2 passes the carrier 6 to the third rotary wheel 2, the third rotary wheel 2 passes the carrier 6 to the fourth rotary wheel 2, and so on. Thus, the carrier 6 is continuously moved rightward. Individual rotation of the rotary wheels 2 can be independently controlled, if necessary.

Figure 7:
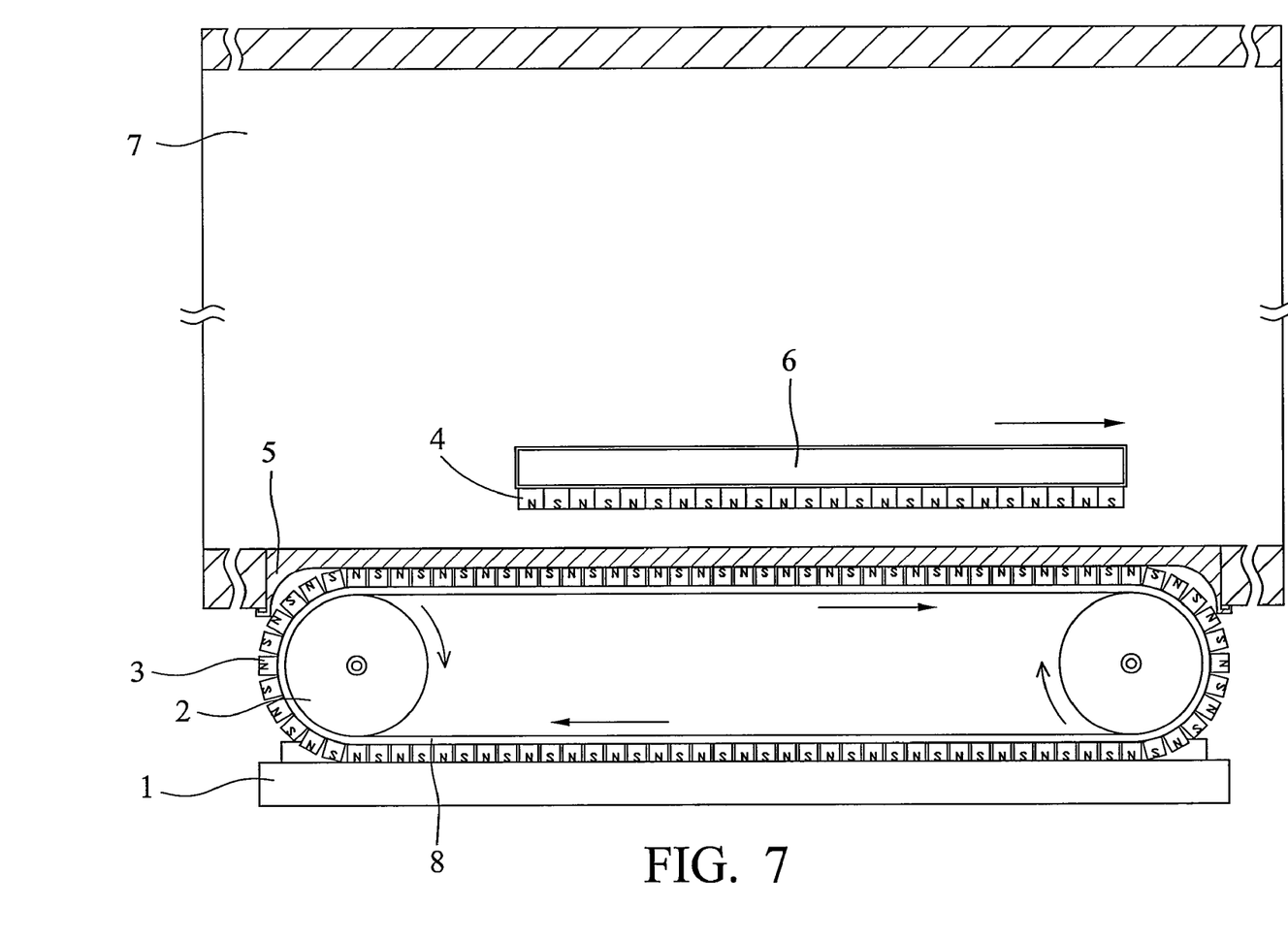
FIG. 7 is a sectional view of a substrate transport device in accordance with a modified embodiment of the invention.
Figure 8:
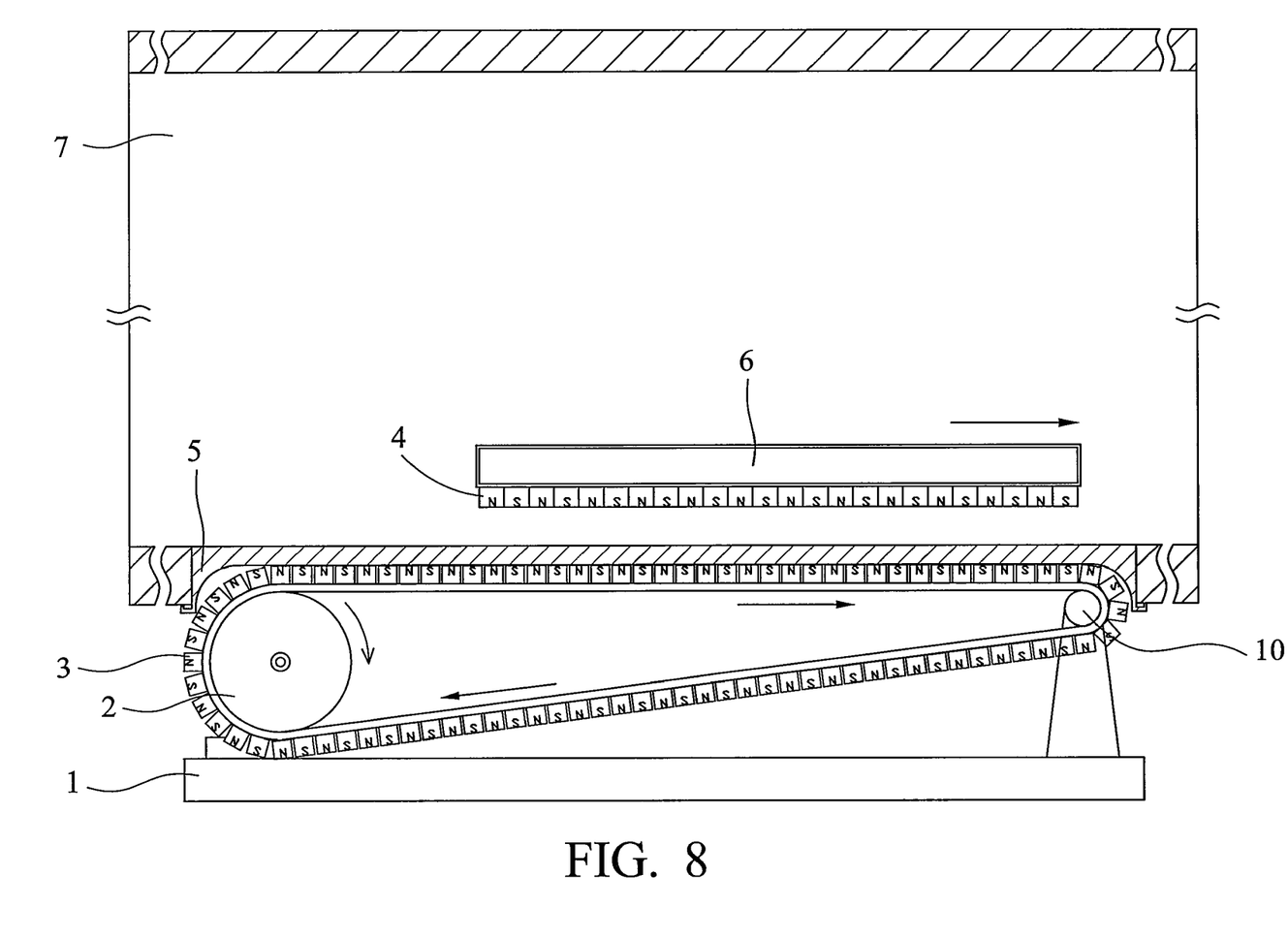
FIG. 8 is a sectional view of a substrate transport device in accordance with another modified embodiment of the invention.

FIG. 7 depicts a modified embodiment of the substrate transport device, wherein caterpillar tracks 8 are disposed around and driven by rotary wheels 2. First magnets 3 are disposed at the periphery of the caterpillar tracks 8. The rotary wheels 2, the caterpillar tracks 8, and the first magnets 3 constitute a driving module for moving the carrier 6 in the chamber 7. FIG. 8 depicts another modified embodiment of the substrate transport device, wherein the caterpillar tracks 8 are disposed around a rotary wheel 2 and a supporting element 10. The caterpillar tracks 8 are driven by the rotary wheel 2 and maintained in a normal position during operation by the supporting element 10. The supporting element 10 may be a fixed pin, a cylindrical bar, or similar. A plurality of first magnets 3 is disposed at the periphery of the caterpillar tracks 8. The rotary wheel 2, the supporting element 10, the caterpillar tracks 8, and the first magnets 3 constitute a driving module for moving the carrier 6 in the chamber 7.

When the rotary wheel 2 is rotated clockwise, the upper part of the caterpillar tracks 8 and the first magnets 3 thereon are moved toward the right. The magnetic fields created by the first and second magnets 3 and 4 thus change in phase. Then, the second magnets 4 are moved rightward by the magnetic forces induced by the magnetic fields such that the carrier 6 thereon is moved toward the right. It is understood that more than one driving module can be provided to move the carrier 6 in the chamber 7. Furthermore, the driving modules can be independently controlled, if necessary.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate transport device, comprising:
   a chamber comprising a bottom wall having a plurality of openings;
   a plurality of rotary wheels disposed outside the chamber and respectively beneath the openings in the bottom wall;
   a plurality of first magnets disposed along the circumference of the rotary wheels;
   a linear rail transversely disposed above the plurality of openings in the bottom wall;
   a carrier disposed in the chamber and on the linear rail, wherein the linear rail defines a direction of movement of the carrier;
   a plurality of second magnets disposed on the carrier, the second magnets disposed in line with the direction of movement of the carrier; and
   a plurality of partitions disposed in the openings in the bottom wall of the chamber and positioned over the rotary wheels, wherein the partitions are thinner than the bottom wall between the first magnets and the second magnets,
   wherein the openings in the bottom wall, the partitions and the rotary wheels are respectively spaced apart along the line of movement of the carrier.

2. The substrate transport device as claimed in claim 1, wherein rotation of which the rotary wheels is independently controlled.

3. The substrate transport device as claimed in claim 1, wherein the chamber is not made of inducible magnetic material.

4. The substrate transport device as claimed in claim 1, wherein the chamber is made of inducible magnetic material.

5. The substrate transport device as claimed in claim 4, wherein the partition is not made of inducible magnetic material.

6. The substrate transport device as claimed in claim 1, wherein the carrier comprises a side facing the first magnets, and the second magnets are disposed on said side.

7. The substrate transport device as claimed in claim 1, wherein the magnetic poles of a first magnet and the adjacent magnetic poles of other first magnets are opposite.

8. The substrate transport device as claimed in claim 1, wherein the magnetic poles of a second magnet and the adjacent magnetic poles of other second magnets are opposite.

9. The substrate transport device as claimed in claim 1, wherein the first magnets are permanent magnets.

10. The substrate transport device as claimed in claim 1, wherein the second magnets are permanent magnets.

11. A substrate transport device, comprising:
    a chamber comprising a bottom wall having at least one opening;
    a driving module disposed outside the chamber, comprising a rotary wheel and caterpillar tracks disposed around the rotary wheel disposed beneath the opening in the bottom wall;
    a plurality of first magnets disposed at the periphery of the caterpillar tracks;
    a linear rail transversely disposed above the opening in the bottom wall;
    a carrier disposed in the chamber and on the linear rail, wherein the linear rail defines a direction of movement of the carrier;
    a plurality of second magnets disposed on the carrier, the second magnets disposed in line with the direction of movement of the carrier; and
    at least one partition disposed in the opening in the bottom wall of the chamber and positioned over the caterpillar track, wherein the partition is thinner than the bottom wall between the first magnets and the second magnets,
    wherein the opening, the partition, and the caterpillar track extend in the line of movement of the carrier.

12. The substrate transport device as claimed in claim 11, wherein the driving module further comprises a supporting element, and the caterpillar tracks are further disposed around the supporting element.

13. The substrate transport device as claimed in claim 12, wherein the supporting element comprises a fixed pin or a cylindrical bar.

14. The substrate transport device as claimed in claim 11, wherein the chamber is not made of inducible magnetic material.

15. The substrate transport device as claimed in claim 11, wherein the chamber is made of inducible magnetic material.

16. The substrate transport device as claimed in claim 15, wherein the partition is not made of inducible magnetic material.

17. The substrate transport device as claimed in claim 11, wherein the carrier comprises a side facing the first magnets, and the second magnets are disposed on said side.

18. The substrate transport device as claimed in claim 11, wherein the magnetic poles of a first magnet and the adjacent magnetic poles of other first magnets are opposite.

19. The substrate transport device as claimed in claim 11, wherein the magnetic poles of a second magnet and the adjacent magnetic poles of other second magnets are opposite.

20. The substrate transport device as claimed in claim 11, wherein the first magnets are permanent magnets.

21. The substrate transport device as claimed in claim 11, wherein the second magnets are permanent magnets.

* * * * *